US009784012B2

(12) United States Patent
Pacheco

(10) Patent No.: US 9,784,012 B2
(45) Date of Patent: Oct. 10, 2017

(54) SYSTEMS AND METHODS FOR INSTALLING A LIVESTOCK FENCE ACROSS A WATERWAY

(71) Applicant: Jose A. Pacheco, Mayer, AZ (US)

(72) Inventor: Jose A. Pacheco, Mayer, AZ (US)

(73) Assignee: Jose A. Pacheco, Mayer, AZ (US)

( * ) Notice: Subject to any disclaimer, the term of this patent is extended or adjusted under 35 U.S.C. 154(b) by 0 days.

(21) Appl. No.: 15/443,925

(22) Filed: Feb. 27, 2017

(65) Prior Publication Data

US 2017/0234032 A1 Aug. 17, 2017

Related U.S. Application Data

(62) Division of application No. 15/044,703, filed on Feb. 16, 2016, now Pat. No. 9,611,670.

(51) Int. Cl.
| | |
|---|---|
| *E04H 17/22* | (2006.01) |
| *E04H 17/26* | (2006.01) |
| *A01K 15/04* | (2006.01) |
| *A01K 15/00* | (2006.01) |
| *E02D 7/02* | (2006.01) |

(52) U.S. Cl.
CPC ......... *E04H 17/263* (2013.01); *A01K 15/006* (2013.01); *A01K 15/04* (2013.01); *E02D 7/02* (2013.01); *E04H 17/22* (2013.01)

(58) Field of Classification Search
CPC .. A01K 3/002; E02B 3/06; E02B 3/04; E02B 3/10; E02B 3/023; E02B 5/085; E04H 17/08; E04H 17/10; E04H 17/14
See application file for complete search history.

(56) References Cited

U.S. PATENT DOCUMENTS

| | | | | |
|---|---|---|---|---|
| 944,907 A | * | 12/1909 | Powers | E02B 1/006 210/156 |
| 1,034,248 A | * | 7/1912 | Keck et al. | A01K 3/002 256/13 |
| 1,371,119 A | * | 3/1921 | Scott | E02B 3/04 405/35 |
| 1,399,819 A | * | 12/1921 | Stine | E06B 11/00 256/13 |
| 1,466,972 A | * | 9/1923 | Stine | E06B 11/00 256/13 |
| 1,999,637 A | * | 4/1935 | Pettepher | E02B 1/006 210/113 |

(Continued)

*Primary Examiner* — Daniel Wiley
(74) *Attorney, Agent, or Firm* — Jennings Strouss & Salmon, PLC; Michael K. Kelly

(57) ABSTRACT

A livestock fence assembly is provided for use across a waterway having a flow direction and a substantially horizontal bed surface. The fence assembly includes: a foundation having a bottom portion configured to be disposed parallel to and below the bed surface, a top portion configured to be disposed proximate the bed surface, and an interior region between the top portion and bottom portion; and a plurality of spaced apart poles, each having a proximal segment secured to the bottom portion of the foundation and secured to the top portion of the foundation, and having a distal segment extending upwardly in a plane which forms an angle α between 30° and 75° relative to the flow direction, wherein the assembly is substantially devoid of any structure between distal segments of adjacent poles.

18 Claims, 7 Drawing Sheets

(56) References Cited

U.S. PATENT DOCUMENTS

| | | | | | |
|---|---|---|---|---|---|
| 2,792,115 | A | * | 5/1957 | Medearis | B03C 1/28 |
| | | | | | 209/223.1 |
| 2,895,716 | A | * | 7/1959 | Veltri | E04H 17/10 |
| | | | | | 256/23 |
| 3,159,248 | A | * | 12/1964 | Biehn | E04H 17/08 |
| | | | | | 52/152 |
| 3,469,403 | A | * | 9/1969 | Ishikawa | E02B 3/023 |
| | | | | | 405/34 |
| 3,890,751 | A | * | 6/1975 | Caputo | E02D 27/42 |
| | | | | | 52/166 |
| 3,945,747 | A | * | 3/1976 | Cruz | E01F 15/025 |
| | | | | | 256/19 |
| 4,110,216 | A | * | 8/1978 | Wagnon | B01D 35/28 |
| | | | | | 210/156 |
| 4,762,438 | A | * | 8/1988 | Dewing | E01F 9/588 |
| | | | | | 404/6 |
| 5,174,681 | A | * | 12/1992 | Atkinson | E02B 3/06 |
| | | | | | 405/21 |
| 5,186,438 | A | * | 2/1993 | Cross | E01F 7/04 |
| | | | | | 256/12.5 |
| 5,255,997 | A | * | 10/1993 | Bailey | E02B 3/04 |
| | | | | | 405/15 |
| 5,301,925 | A | * | 4/1994 | Carlson | E04H 17/06 |
| | | | | | 256/13 |
| 5,586,753 | A | * | 12/1996 | Michiaels | E04H 17/063 |
| | | | | | 256/19 |
| 5,752,691 | A | * | 5/1998 | Bashon | E04H 17/06 |
| | | | | | 256/1 |
| 7,758,278 | B2 | * | 7/2010 | Tamburro | E01C 11/222 |
| | | | | | 248/530 |
| 8,979,429 | B2 | * | 3/2015 | Nankervis | E02B 5/085 |
| | | | | | 405/21 |
| 2013/0299435 | A1 | * | 11/2013 | Coffman | E02B 5/085 |
| | | | | | 210/747.3 |

* cited by examiner

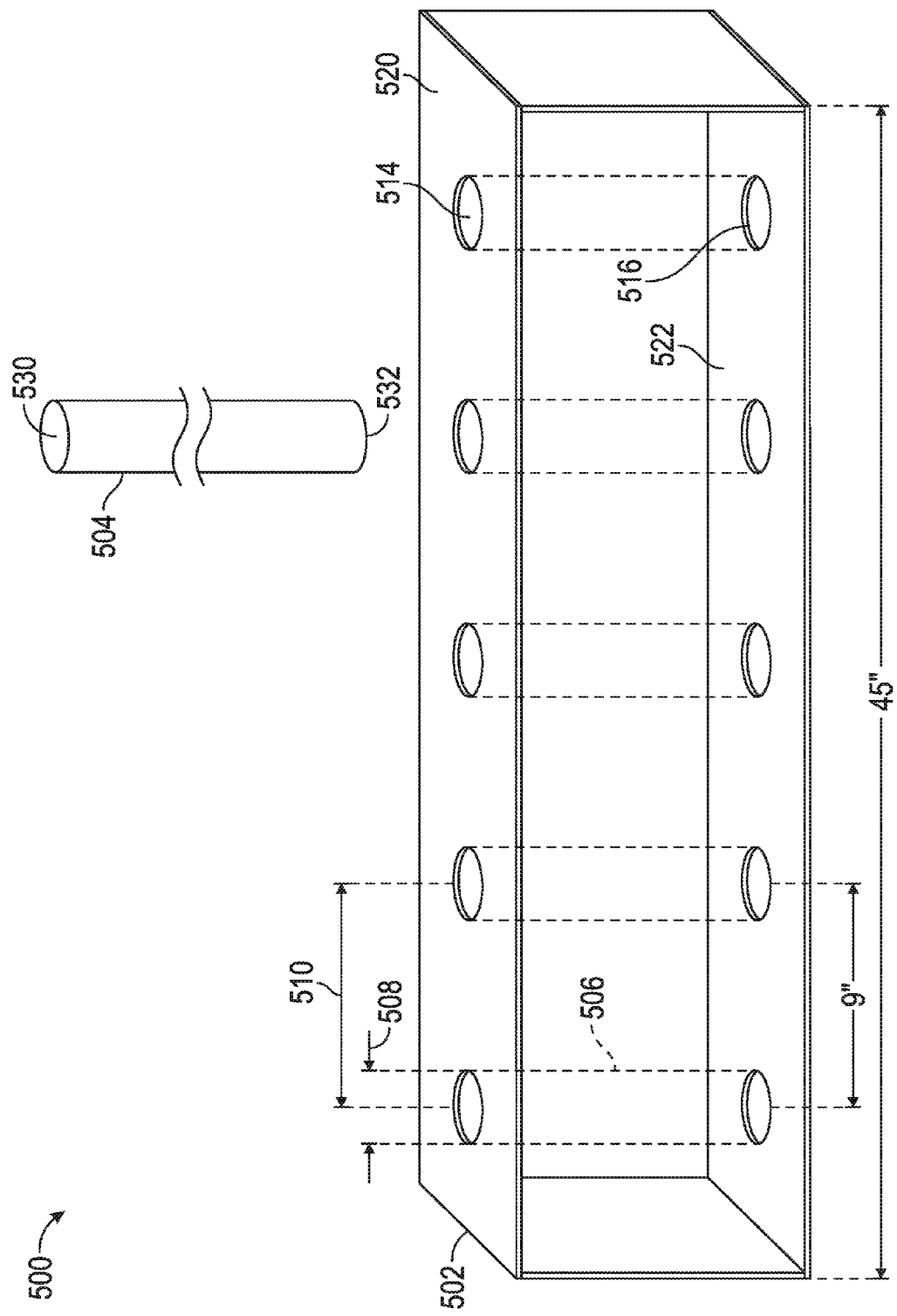

SYSTEMS AND METHODS FOR INSTALLING A LIVESTOCK FENCE ACROSS A WATERWAY

RELATED APPLICATION

This is a divisional of U.S. application Ser. No. 15/044,703, filed Feb. 16, 2016.

TECHNICAL FIELD

The present invention relates, generally, to systems and methods for installing a livestock fence across a waterway and, more particularly, to a fence construction which allows downstream passage of water and debris while impeding the passage of cattle.

BACKGROUND

Cattle grids are often used to prevent livestock, such as sheep, cattle, pigs, horses, or mules, from passing along a road, walkway, cart path, or railway which interrupts fencing surrounding an enclosed border. A typical cattle grid consists of a depression in the road covered by a transverse grid of metal bars or tubes having fixed ends on both sides of the depression, such that the gaps between the bars are wide enough for animals' legs to fall through, but sufficiently narrow to allow a wheeled vehicle or human foot. This provides an effective barrier to animals without impeding wheeled vehicles, as the animals are reluctant to walk on the grates.

Cattle grids, however, are impractical for use with rivers, creeks, streams, canals, ravines, gullies, washes and the like, whether flowing or dry (collectively referred to herein as waterways). Waterways thus present unique challenges as an unwanted path for livestock egress from an otherwise confined land area.

Prior art livestock fences spanning waterways typically involve a support structure mounted on the waterway bed, with a flexible mesh fence extending above the support. However, these fences tend to collect debris, particularly after heavy rains. Accumulated debris poses a risk of upstream flooding, thus requiring regular maintenance.

Other prior art livestock fences spanning waterways involve a horizontal rod, pole, or cable above the bed which supports a hinged fence, vertically hanging chains, or other structure which permits the free flow of water, yet swings out of the way to allow debris to pass underneath the swinging structure. These approaches involve fences that include moving parts, involve regular maintenance, and/or typically require two or more people to install.

A culvert is a structure that allows water to flow under a road, railroad, trail, or similar obstruction from one side to the other side. Typically embedded so as to be surrounded by soil, a culvert may be made from a pipe, reinforced concrete or other material. Culverts are commonly used both as cross-drains for ditch relief and to pass water under a road at natural drainage and stream crossings. A culvert may be a bridge-like structure designed to allow vehicle or pedestrian traffic to cross over the waterway while allowing adequate passage for the water. Presently known culvert designs include rectangular or rounded bars extending parallel to the direction of water flow, supported by supporting members transversely oriented to the direction of flow. These cross members also tend to collect debris, resulting in upstream flooding during heavy rains.

Systems and methods are thus needed which overcome these limitations. Various desirable features and characteristics will also become apparent from the subsequent detailed description and the appended claims, taken in conjunction with the accompanying drawings and this background section.

BRIEF SUMMARY

Various embodiments of the present invention relate to an improved maintenance free livestock fence for installation across of all types of waterways from small creeks (to keep family pets in the yard), large washes and rivers to maintain cattle within grazing boundaries. In one embodiment, the livestock fence comes in the form of a "do-it-yourself" (DIY) kit for convenient installation by a single person.

In accordance with one aspect of the present invention, a plurality of cylindrical vertically extending rods are installed a downstream angle, such as by being cantilever mounted to the ground or to a foundation structure which may be buried beneath the waterway bed. In a preferred embodiment, the rods require no cross mounting members and, hence, water and small debris (e.g., weeds, trash) may freely pass between the (preferably rounded) rods. Larger debris such as trees may glide over the angled rods, assisted by rising water levels during heavy rains.

Another embodiment includes a row of rods mounted to and extending from an anchoring foundation, which may be rectangular or any other suitable shape which allows the rods to be securely fastened or otherwise affixed to the foundation. Cross members, ladder structures, or other structural elements may be housed within or adjacent to the foundation to strengthen the rods. When the foundation is fully or partially buried under the waterway bed, only the distal segments of the rods appreciably protrude above the ground, reducing or eliminating the accumulation of debris. Consequently, the need for maintenance is also reduced or eliminated, as well as the upstream flooding normally occasioned by built up debris.

A further embodiment includes a portable fence building template having a plurality of opening on a top and bottom surfaces. Poles may be inserted through the holes and pounded into the creek bed. The template may then be removed from the poles, and moved laterally along a line perpendicular to the flow direction, to thereby maintain consistent spacing between rods, as well as a consistent angular orientation of the rods with respect to the direction of water flow.

Various other embodiments, aspects and features are described in greater detail below.

BRIEF DESCRIPTION OF THE DRAWING FIGURES

Exemplary embodiments will hereinafter be described in conjunction with the following drawing figures, wherein like numerals denote like elements, and:

FIG. 5 is a perspective view of a do-it-yourself (DIY) template and a rod in accordance with various embodiments;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to an improved cattle fence design which allows water and small debris to pass through, and which uses flowing water to lift large debris up and over the angled vertical fence members.

Figure 1:
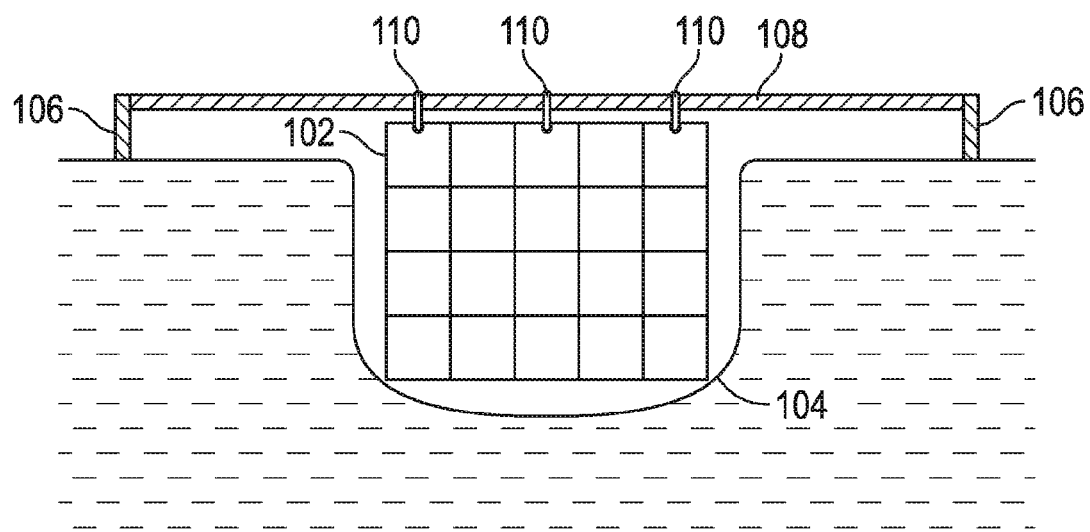
FIG. 1 is a schematic cross section view of a prior art livestock fence spanning a waterway, shown hinged to a cross bar so that the fence swings about the cross bar to allow debris to pass underneath the fence.

FIG. 1 is a schematic cross section view of a prior art livestock fence 102 spanning a waterway 104. More particularly, respective posts 106 support a cable or rod 108, upon which the fence or fence sections 102 are hingedly connected. As water flows downstream, the force of the flowing water causes the fence 102 to pivot about the rod 108, so that the fence swings about the rod to allow debris to pass underneath the fence.

Figure 2:
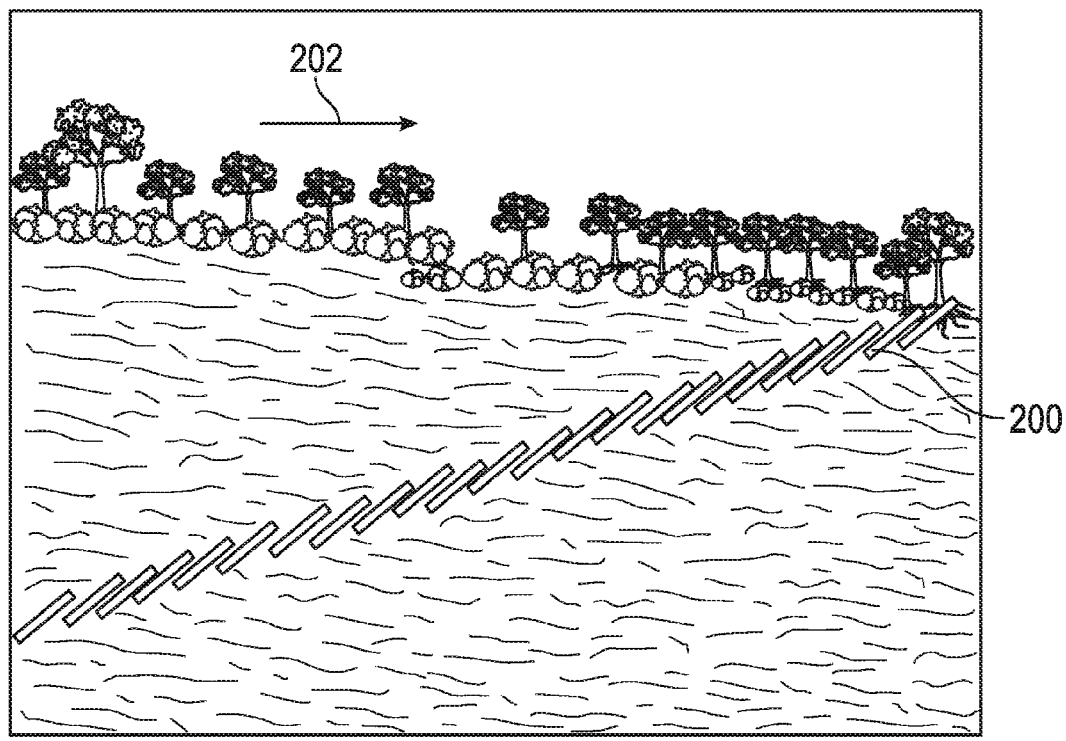
FIG. 2 is perspective view of an exemplary livestock fence illustrating a row of rods angled in the direction of water flow to allow debris to pass over the rods under high water conditions, in accordance with various embodiments.

FIG. 2 is perspective view of an improved livestock fence 200 in accordance with the present invention. More particularly, the fence 200 includes a row of rods angled in the general direction 202 of water flow to allow debris (not shown for clarity) to pass up and over the rods under high water conditions.

Figure 3:
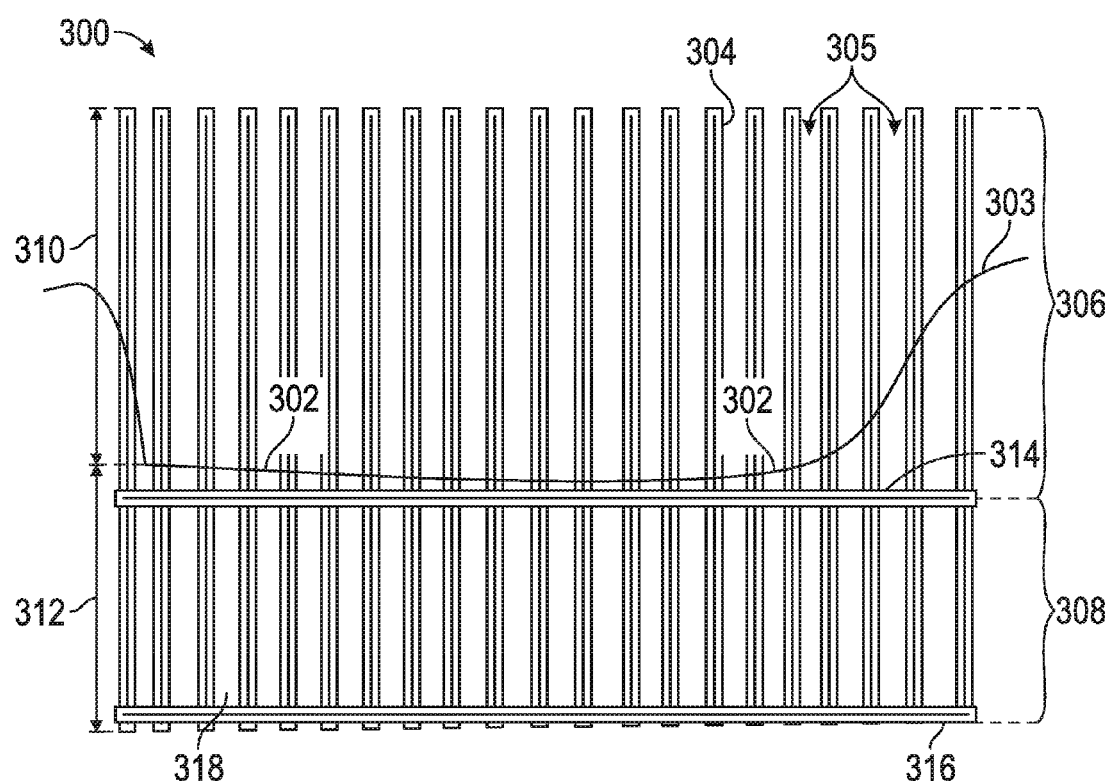
FIG. 3 is a cross section view of a livestock fence including cross bar supports for the vertical members, together forming a ladder structure, in accordance with various embodiments.

FIG. 3 is a cross section view of a livestock fence 300 for installation across a waterway (e.g., creek, river, wash) having a waterway bed 302 and respective banks 303. More particularly, the fence 300 includes a plurality of spaced apart posts 304, each having a distal (top) segment 306 and a proximal (bottom) segment 308. When installed, the distal segments 306 extend above the wash or creek bed 302, and have a length in the range of 1 to 7 feet, and preferably about 2 to 6 feet, and most preferably about 4 feet. The proximal segments 308 extend below the wash or creek bed 302, and have a length in the range of 1 to 5 feet, and preferably about 2 to 4 feet, and most preferably about 3 feet. The fence 300 may also include one or more cross bar supports 314, 316, which together may form a ladder structure 318. In a particularly preferred embodiment, the portion of the fence above the waterway bed (and particularly the interstitial regions 305 between adjacent posts 304) is substantially or entirely devoid of cross members or other structure which snags or impedes the flow of debris, thereby reducing fence maintenance.

With continued reference to FIG. 3, each post 304 may comprise any suitable material of any suitable cross sectional shape (e.g., polygonal, rectangular, elliptical, circular). In one embodiment, post 304 comprises hollow steel tubing having an outside diameter in the range of 1 to 6 inches, and preferably about 2 to 4 inches, and most preferably about 3 inches. The center-to-center distance between adjacent posts 304 may be in the range of 3 to 15 inches, and preferably about 6 to 12 inches, and most preferably about 9 inches. Hollow posts may comprise a wall thickness in the range of $1/16$ to $3/4$ inches.

Figure 4:
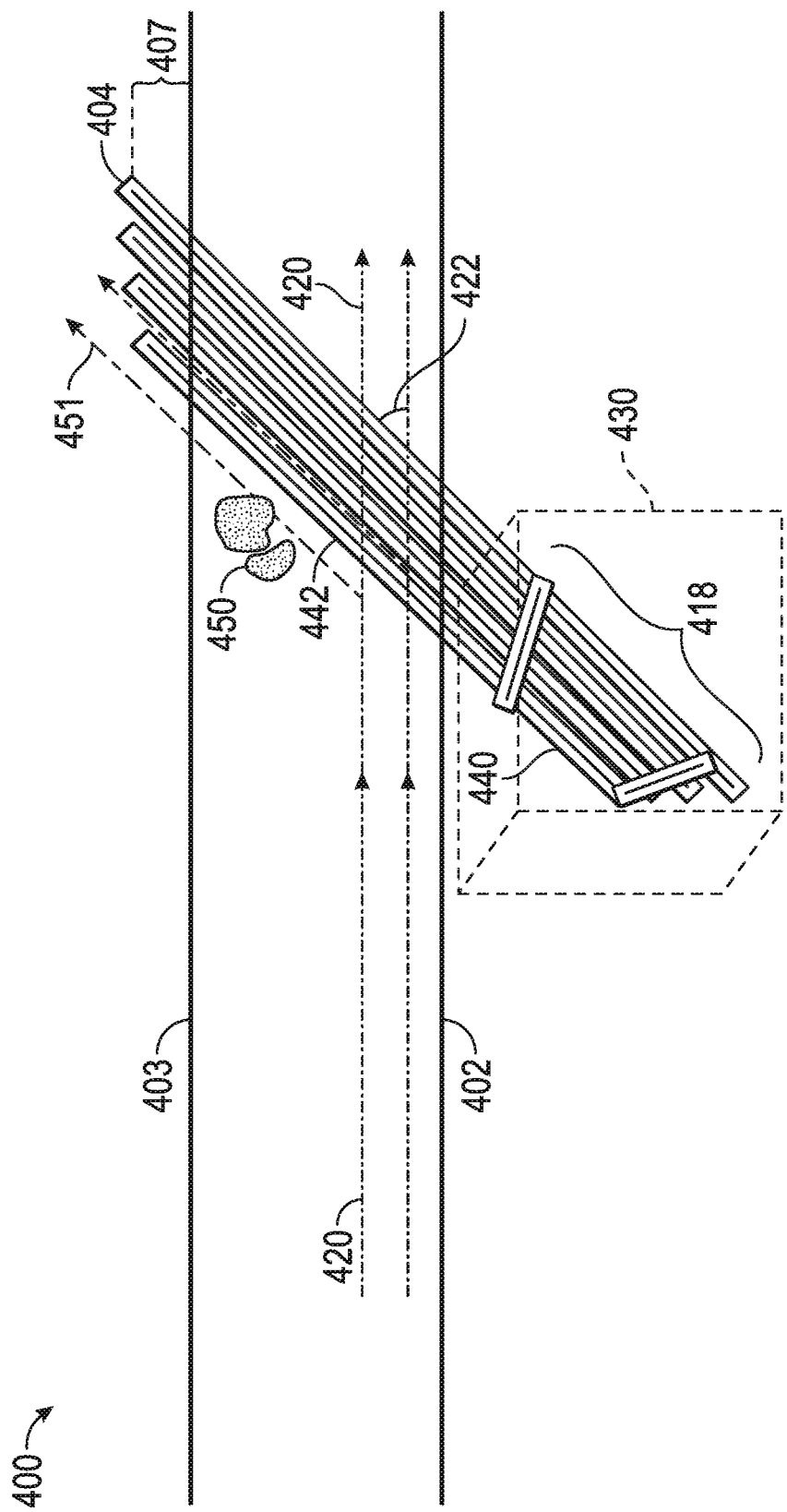
FIG. 4 is a side elevation view of the fence of FIG. 3, with the proximal ends of the rods secured to a foundation in accordance with various embodiments.

FIG. 4 is a side elevation view of the fence shown in FIG. 3, with the proximal ends of the rods secured to a foundation configured to be buried under the creek bed. More particularly, a livestock fence assembly 400 includes a plurality of posts 404, each having a proximal segment 440 and a distal segment 442. In the illustrated embodiment, the proximal ends are secured to a foundation 430 such as, for example, a concrete block, which may be buried under a waterway bed 402.

With continued reference to FIG. 4, the fence assembly 400 further includes one or more cross members secured to the posts to form a ladder structure 418. When the foundation is buried under the creek bed, the distal segments 442 extend above the creek bank 403 at an angle 442 (e.g., 45°) with respect to a direction of flow 420. Smaller debris and water may flow between adjacent posts, whereas larger debris 450 may be urged up and over the tops of the posts by rising water.

FIG. 5 is a perspective view of a do-it-yourself (DIY) kit 500 including a template 502 and a plurality of rods or posts 504. More particularly, the template 502 includes a top row 520 of openings 514, and a bottom row 522 of openings 516. The template 502 may be used as a guide to drive the posts into a creek bed as described below, alternatively, the template may be used as a foundation, wherein the posts are secured to the template and the entire structure buried beneath the creek bed.

With continued reference to FIG. 5, the size 508 (e.g., diameter) of the openings is desirably slightly larger than the size of the post (e.g., 3 inch diameter) received therein. The center-to-center distance 510 between adjacent posts may be in the range of 9 inches. In an embodiment, the top 530 of each post may be flat and the bottom 532 may be pointed or wedge shaped to facilitate manually driving the post onto the ground.

Figure 6A:
FIGS. 6A-6G are a series of cross section views depicting the DIY installation of a livestock fence across a waterway in accordance with various embodiments.
Figure 6B:
Figure 6C:
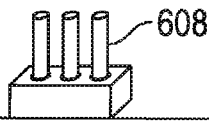
Figure 6D:
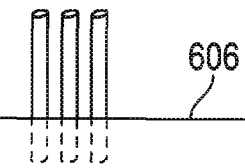
Figure 6E:
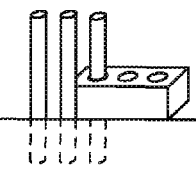
Figure 6F:
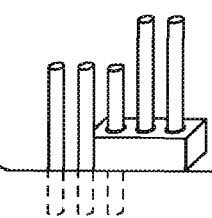
Figure 6G:
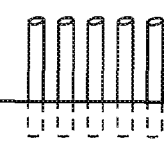

FIGS. 6A-6G are a series of cross section views depicting the DIY installation of a livestock fence across a waterway 602 in using the kit shown in FIG. 5 accordance with various embodiments. More particularly, a template 604 may be placed on a creek bed 606 (FIG. 6B), and posts inserted into the holes (FIG. 6C). After the posts are pounded into the ground, the template 602 may be removed, for example by lifting it off of the posts which are now secured into the creek bed bottom (FIG. 6D). The template 602 may then be moved to the right in and slid down over one or more posts as shown in FIG. 6E. Additional posts may then be inserted into the empty holes (FIG. 6F) and pounded into the creek bed, whereupon the template may again be removed and moved further to the right, and so on as necessary to complete the fence.

Figure 7:
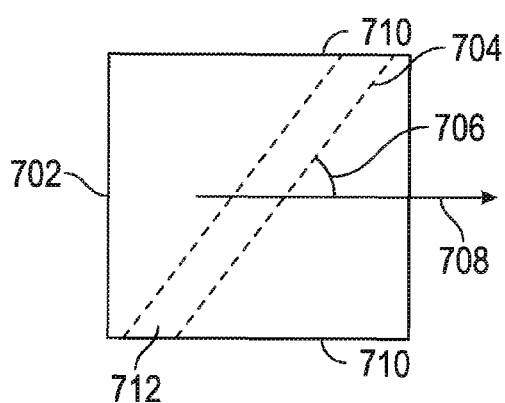
FIG. 7 is a side elevation view of the template shown in FIG. 5 in accordance with various embodiments.

FIG. 7 is a side elevation view of a template 702 including a through hole 710 for receiving a rod or post. The through hole is formed in the template at an angle 706 with respect to a flow direction 708 when the template bottom 710 is disposed on a substantially horizontal surface of a waterway bed. Alternatively, the template 702 may comprise a foundation structure buried underneath the waterway bed, where the posts are secured within the template and extend above the waterway bed. In the embodiment shown in FIG. 7, the top hole 710 and bottom hole 712 are suitable elliptical, while the cross section of the through hole 704 may be circular.

Figure 8:
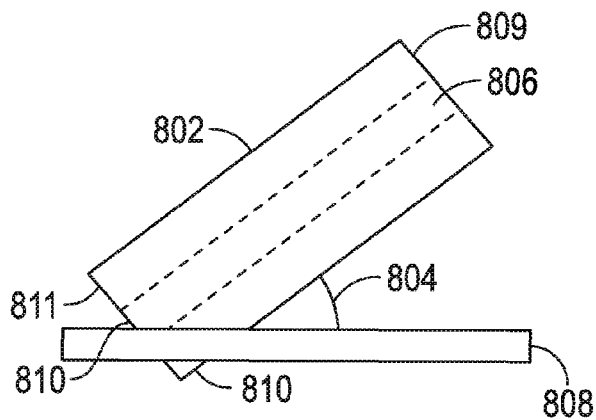
FIG. 8 is an alternate embodiment of a template including a cut out portion for receiving a stabilizing lever arm in accordance with various embodiments.

FIG. 8 is an alternate embodiment of a template (or foundation structure) 802 having a through hole 806 which extends orthogonally between a top surface 807 and a bottom surface 811 of the template. In order to orient the template at an appropriate angle 804 (e.g., 45°) relative to a horizontal flow direction, the template may include a cut out portion 810 configured to receive a stabilizing lever arm 808.

Figure 9:
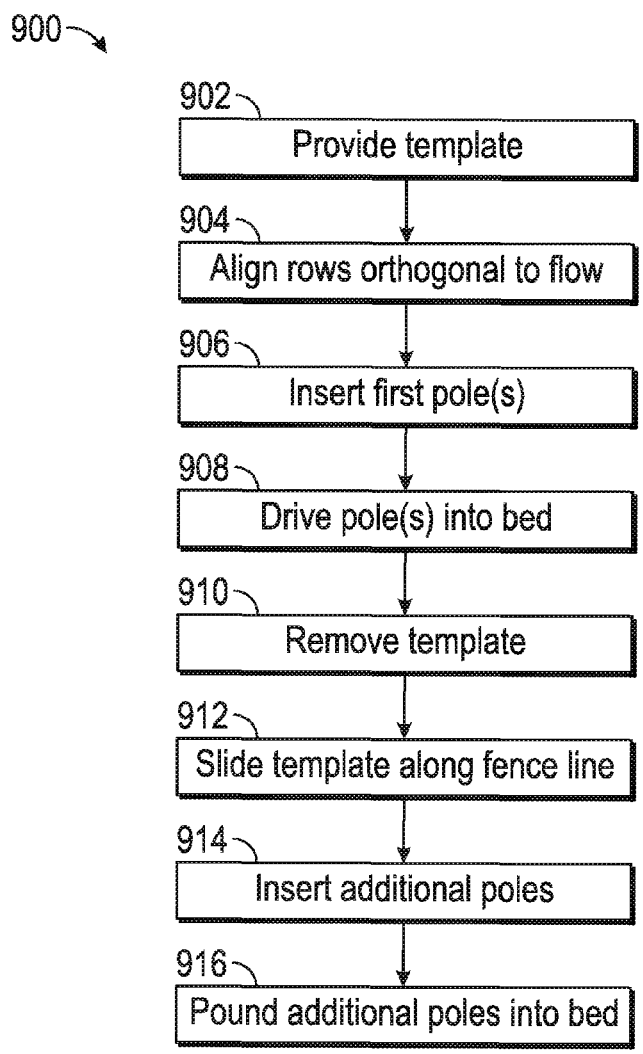
FIG. 9 is a flow chart illustrating a DIY method of installing a livestock fence in accordance with various embodiments.

FIG. 9 is a flow chart illustrating a DIY method 900 of installing a livestock fence in accordance with various embodiments. More particularly, the method includes providing a template having a top row of openings and a bottom row of openings, where each top opening is aligned with a corresponding bottom opening (Task 902). The template may be placed on a waterway bed with the first and second rows substantially orthogonal to a water flow direction (Task 904). A first pole is then inserted into one of the first openings and fed downwardly through the corresponding bottom opening in the second row such that the pole forms an angle α in the range of 30° to 60° relative to the water flow direction (Task 906).

With continued reference to FIG. 9, the method 900 further includes impacting (e.g., with a t-post driver) the top end of the first pole to drive the bottom end of the first pole into the waterway bed (Task 908), and removing the template from the first pole (Task 910). The template is then lifted off the post(s) and moved down the fence line, whereupon the first pole is guided through a different one of the second openings and extended upwardly through a corresponding opening in the top of the template (Task 912) to align the template holes with the fence line and maintain a uniform spacing between the posts. Additional poles are then inserted into the first openings (Task 914) and driven into the waterway bed (Task 916), and so on until the fence spans the waterway.

In circumstances where the waterway cuts across a property line, the fence line should optimally be oriented orthogonally to the anticipated direction of water flow, as opposed to being parallel to the property line.

Figure 10:
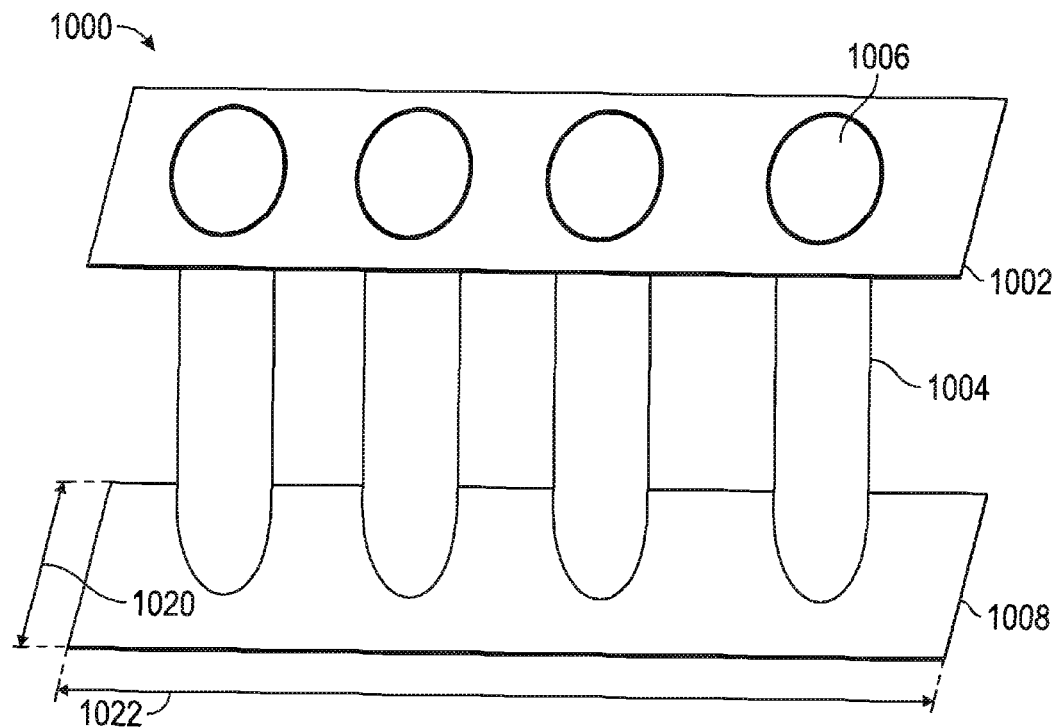
FIG. 10 is a front elevation schematic view of an alternative DIY fence template in accordance with various embodiments.

FIG. 10 is a front elevation schematic view of an alternative DIY fence template 1000 comprising pipes welded or otherwise secured between two plates, including a top plate 1002 having a plurality of openings 1006, a bottom plate 1008 having a plurality of corresponding openings (not seen in the drawing), and a plurality of tubes 1004 extending between the openings. In a preferred embodiment, the width 1020 of one or both of the plates ins in the range of 3 to 48 inches, and preferably about 6 to 24 inches, and the length 1022 is in the range of 1 to 9 feet, and preferably about 2 to 6 feet, and most preferably about 3 feet. In one embodiment, the tubes 104 are in the range of 3 inches in diameter spaced apart at 9 inch centers, yielding a 6 inch gap between adjacent pipes.

Figure 11:
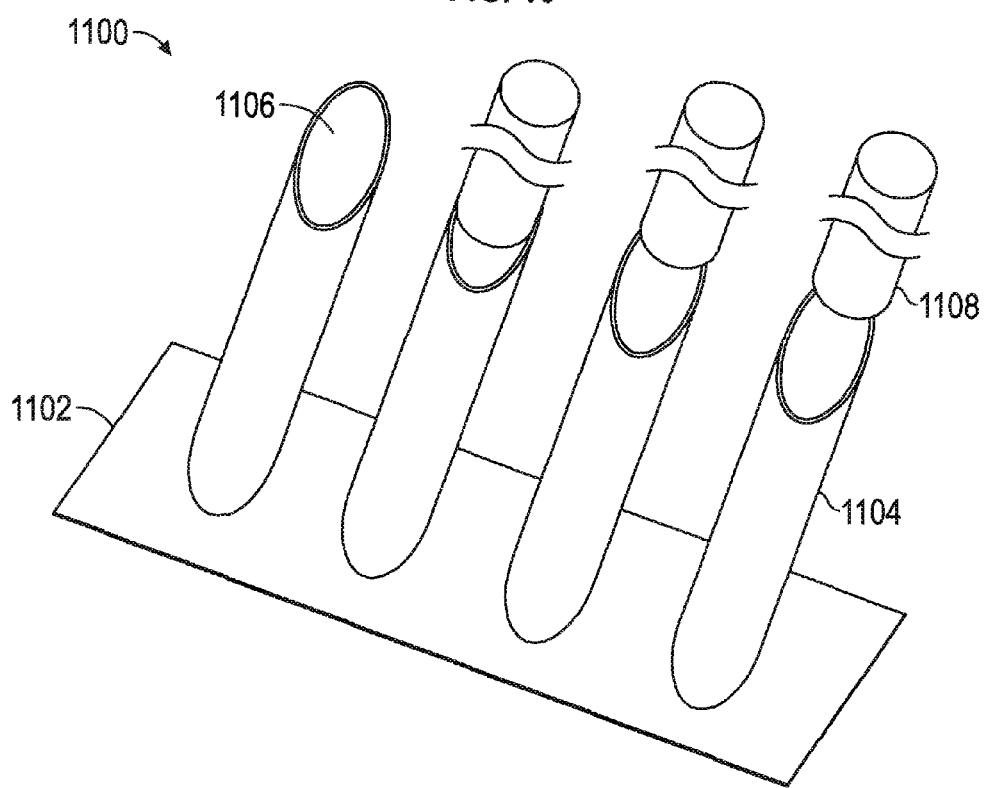
FIG. 11 is a perspective schematic elevation view of a further alternative DIY fence template in accordance with various embodiments.

FIG. 11 is a perspective schematic elevation view of an alternative DIY fence template 1100 comprising a single plate 1102 and a plurality of tubes 1104, each having an opening 1106 configured to receive a post 1108.

A livestock fence assembly is thus provided for use across a waterway having a flow direction and a substantially horizontal bed surface. The fence assembly includes: a foundation having a bottom portion configured to be disposed parallel to and below the bed surface, a top portion configured to be disposed proximate the bed surface, and an interior region between the top portion and bottom portion; and a plurality of spaced apart poles, each having a proximal segment secured to the bottom portion of the foundation and secured to the top portion of the foundation, and having a distal segment extending upwardly in a plane which forms an angle α between 30° and 75° (and preferably about) 45° relative to the flow direction; wherein the assembly is substantially devoid of any structure between distal segments of adjacent poles.

In an embodiment, the foundation comprises a substantially rectangular box, where the interior may be hollow or solid.

In an embodiment, the foundation comprises concrete.

In an embodiment, the fence further includes a cross section member interconnecting the poles within the foundation.

In another embodiment, the fence includes first and second cross section members interconnecting the poles to form a ladder structure.

In an embodiment, the foundation comprises a substantially rectangular solid concrete box.

In an embodiment, the poles may be cantilever mounted to the foundation.

In an embodiment, the fore portion of the pole is rounded.

In an embodiment, the distal segment of the pole is substantially circular in cross section.

In an embodiment, each pole comprises a hollow pipe in the range of about 2 to 4 inches in diameter (and preferably about 3 inches), with a center-to-center spacing in the range of 6 to 12 inches (and preferably about 9 inches).

In an embodiment, each pole is made of an environmentally friendly, corrosion resistant metal material.

In an embodiment, the proximal segment of each pole is in the range of 1 to 5 feet (and preferably about 3 feet) in length, and the distal segment of the pole is in the range of 3 to 7 (and preferably about 6) feet in length.

In an embodiment, the distal segment of each pole is configured to resiliently flex to allow debris to pass over the pole in the fore-to-aft flow direction.

A method is also provided for installing a livestock fence which requires only a single person. The method includes: providing a substantially rectangular template having a first row of openings in a top surface and a second row of openings in a bottom surface such that each opening in the first row is aligned with a corresponding opening in the second row; placing the template on a waterway bed with the first and second rows substantially orthogonal to a water flow direction; inserting a first pole into one of the first openings and extending the first pole downwardly through a corresponding opening in the second row such that the first pole forms an angle α in the range of 30° to 60° relative to the water flow direction; impacting (e.g., with a t-post driver) the top end of the first pole to drive the bottom end of the first pole into the waterway bed; removing the template from the first pole; guiding the first pole through a different one of the second openings and extending the first pole upwardly through a corresponding opening in the first row; inserting a second pole into one of the first openings and extending the first pole downwardly through a corresponding opening in the second row; and impacting the top of the second pole to drive the bottom of the second pole into the waterway bed.

A do-it-yourself (DIY) kit is also provided for installing a livestock fence across a waterway having a flow direction and a bed surface. The kit includes: a template comprising a top surface having at least two openings and a bottom surface having at least two corresponding openings, the template configured to rest on the bed surface such that a line extending between one of the openings on the top surface and a corresponding opening on the bottom surface forms an angle α in the range of 30° to 60° with respect to the flow direction; and a plurality of cylindrical rods for installation into the waterway bed through the top and bottom openings, the rods each having a flat top end and a pointed bottom end.

In an embodiment the template comprises a rectangular hollow box having a cut-out on at least one end, the cut-out configured to removably receive a lever arm to maintain a at about 45°.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed:

1. A method of installing a livestock fence requiring only a single person, the method comprising:
    providing a substantially rectangular template having a first row of openings in a top surface and a second row of openings in a bottom surface such that each opening in the first row is aligned with a corresponding opening in the second row;
    placing the template on a waterway bed with the first and second rows substantially orthogonal to a water flow direction;
    inserting a first pole into one of the first openings and extending the first pole downwardly through a corresponding opening in the second row such that the first pole forms an angle α in the range of 30° to 60° relative to the water flow direction;
    impacting the top end of the first pole to drive the bottom end of the first pole into the waterway bed;
    removing the template from the first pole;
    guiding the first pole through a different one of the second openings and extending the first pole upwardly through a corresponding opening in the first row;
    inserting a second pole into one of the first openings and extending the second pole downwardly through a corresponding opening in the second row; and
    impacting the top of the second pole to drive the bottom of the second pole into the waterway bed.

2. The method of claim 1, wherein each of the first and second rows comprise three (3) openings.

3. The method of claim 1, wherein each of the first and second rows comprise five (5) openings.

4. The method of claim 1, wherein each of the openings of the first row has a diameter in the range of one (1) to six (6) inches.

5. The method of claim 1, wherein each of the openings of the first row has a diameter in the range three (3) inches.

6. The method of claim 1, wherein at least one of the openings in the first row exhibits a circular cross section.

7. The method of claim 1, wherein at least one of the openings in the first row exhibits a rectangular cross section.

8. The method of claim 1, wherein at least one of the openings in the first row exhibits a elliptical cross section.

9. The method of claim 1, wherein at least one of the openings in the first row exhibits a polygonal cross section.

10. The method of claim 1, wherein a center-to-center distance between adjacent openings in the first row is in the range of about three (3) to fifteen (15) inches.

11. The method of claim 10, wherein the center-to-center distance is in the range of about six (6) to twelve (12) inches.

12. The method of claim 11, wherein the center-to-center distance is in the range of about nine (9) inches.

13. The method of claim 1, wherein the first pole comprises hollow steel tubing.

14. The method of claim 13, wherein the hollow steel tubing comprises a wall thickness in the range of $\frac{1}{16}$ to $\frac{3}{4}$ inches.

15. The method of claim 1, further comprising:
    inserting a third pole into one of the first openings and extending the third pole downwardly through a corresponding opening in the second row; and
    impacting the top of the third pole to drive the bottom of the third pole into the waterway bed.

16. The method of claim 1, wherein the substantially rectangular template comprises a bottom surface configured to be positioned substantially horizontally on the waterway bed, such that the through holes extending between the first and second rows are oriented in the range of 30° to 60° relative to the water flow direction.

17. The method of claim 1, wherein the substantially rectangular template comprises:
    a top surface;
    a bottom surface;
    a plurality of through holes extending substantially orthogonally between the top surface and the bottom surface; and
    a cut out portion configured to receive a stabilizing lever arm such that the through holes are inclined at an angle in the range of 30° to 60° relative to the water flow direction.

18. The method of claim 1, wherein impacting comprises striking the pole with a t-post driver.

* * * * *